United States Patent [19]

Jennings

[11] 3,873,896

[45] Mar. 25, 1975

[54] FAILSAFE SYSTEM FOR ENERGIZING THE CAPSTAN MOTOR OF A MAGNETIC TAPE TRANSPORT SYSTEM

[75] Inventor: Thomas Edwin Jennings, Thousand Oaks, Calif.

[73] Assignee: Burroughs Corporation, Detroit, Mich.

[22] Filed: Nov. 5, 1973

[21] Appl. No.: 412,626

[52] U.S. Cl. .......................... 318/7, 318/51, 318/89, 242/182

[51] Int. Cl. .......................... B65h 25/22

[58] Field of Search ............... 318/7, 87, 88, 89, 51, 318/6; 242/182, 183, 184

[56] References Cited

UNITED STATES PATENTS

| | | | |
|---|---|---|---|
| 3,045,937 | 7/1962 | Johnson | 318/7 X |
| 3,117,262 | 1/1964 | Mullin | 318/7 |
| 3,501,682 | 3/1970 | Jacoby | 318/7 |

*Primary Examiner*—B. Dobeck
*Attorney, Agent, or Firm*—Nathan Cass; Benjamin F. Spencer; Edward G. Fiorito

[57] ABSTRACT

To prevent the breakage of tape in a magnetic tape transport system in the event of a complete power failure during normal operation, it has been customary to mechanically or dynamically brake the supply and take-up reels as quickly as possible. If during a normal re-wind cycle a power failure should occur, braking of a high inertia supply reel with its drive motor cannot be achieved as quickly as the relatively low inertia capstan motor stops. A failsafe system is disclosed for generating a voltage varying according to the velocity of rotation of a reel of magnetic tape. The generated voltage is automatically coupled to a power dissipating means upon a power failure to achieve dynamic braking of the reel, and is further automatically coupled to a capstan motor to maintain the capstan motor energized and rotating until the reel of magnetic tape is brought to a stop.

10 Claims, 2 Drawing Figures

FAILSAFE SYSTEM FOR ENERGIZING THE CAPSTAN MOTOR OF A MAGNETIC TAPE TRANSPORT SYSTEM

BACKGROUND OF THE INVENTION

The present invention relates to tape transport systems, and in particular, to a system for energizing a capstan motor upon the loss of power from a primary power source.

Modern magnetic tape transport systems are now operating at tape speeds as high as two-hundred and fifty inches per second during data transfer and in excess of seven-hundred inches per second during rewind. To enable such tape systems to operate at these high speeds, including the required capability of abrupt starting and stopping the tape, numerous design considerations must be incorporated in the transport systems. Important among these considerations is the use of high-power, low-inertia capstan motors; sophisticated vacuum columns with buffers and air bearings to prevent tape wear and breakage; carefully designed speed control circuits for precisely controlling the angular velocity of the capstan and reel motors, and the use of loop sensors to assure adequate tape length within the vacuum columns, just to name a few.

One example of a prior art tape transport system embodying certain of the above design considerations is U.S. Pat. No. 3,688,956 which issued on Sept. 5, 1972 to Magne J. Kjos. Other representative tape transport systems in which the present invention could be incorporated, if desired, are disclosed in U.S. Pat. Nos. 3,705,337 which issued on Dec. 5, 1972 to Sebastian E. Grabl; U.S. Pat. No. 3,648,950 which issued on Mar. 14, 1972 to Sebastian E. Grabl; and U.S. Pat. No. 3,645,471 which issued on Feb. 29, 1972 to Magne J. Kjos.

Of considerable importance in tape transport systems is the capability of abruptly stopping, reversing, and starting the movement of magnetic tape as it passes over the magnetic transducer to provide for controlled erasing, correcting, and updating of the recorded information. Special electronic circuits are employed to provide abrupt starting of low-inertia capstan motors and both dynamic and mechanical braking have been employed with the reel motors to assure abrupt stopping, as required, during the usual and normal operating conditions of a magnetic tape transport system.

The present invention is concerned with a problem which has been found to exist in magnetic tape transport systems, but which does not occur during the normal operation of the system. If during the operation of a tape transport system a complete failure of system power should occur, the high inertia of the reel motors together with their corresponding reels of magnetic tape results in their continued rotation at a time when they should be abruptly stopped. It has been found difficult to stop the high speed rotation of a high-inertia reel motor with its roll of magnetic tape with either dynamic or mechanical braking in less than approximately one second of time. Should complete power failure occur during the high-speed rewind cycle of a tape transport system, it is possible for the supply reel to withdraw too much tape from the vacuum column, thereby resulting in damage to or breakage of a portion of the magnetic tape. This damage could result in the serious loss or destruction of valuable information in a data processing system.

Accordingly, a principal object of this invention is to prevent damage to the magnetic tape in a tape transport system in the event of failure of the primary source of applied power.

A further object is to stop the rotation of the capstan motor of a tape transport system substantially simultaneously with the stopping of the rotation of the reel motor upon failure of the primary source of power.

Another object of this invention is to control the speed of rotation of a capstan motor in accordance with the speed of rotation of a reel motor upon the loss of power being supplied to the capstan motor.

Still another object is to use the back electromotive force generated by a rotating reel motor of a tape transport as a source of power to energize the capstan motor in the event of a failure of the primary source of power.

DETAILED DESCRIPTION OF THE INVENTION

Figures 1, 2:
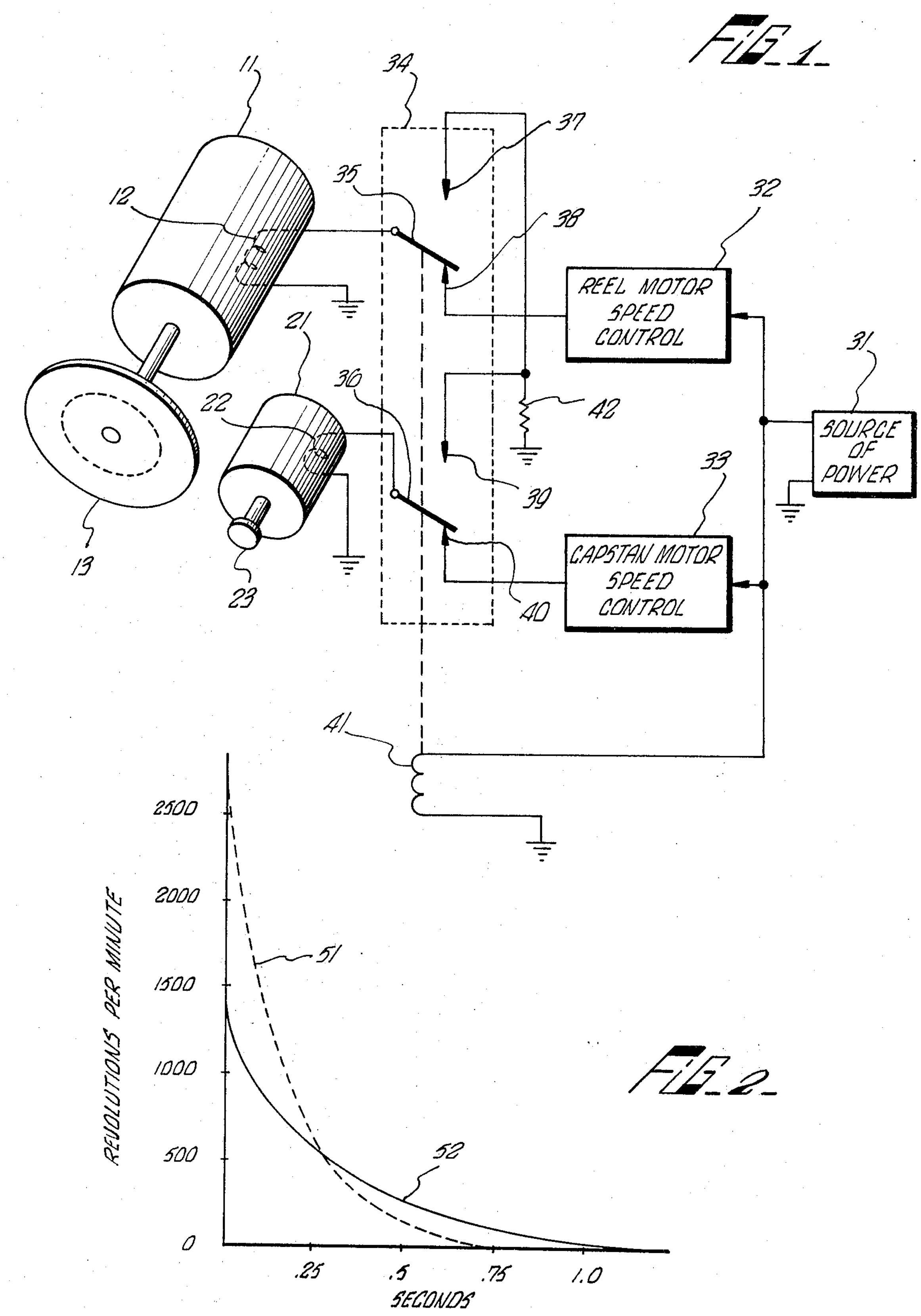
FIG. 1 illustrates the preferred embodiment of the invention.
FIG. 2 is a graph of the speed-time characteristic of the tape reel and reel motor combination during dynamic braking.

Referring to FIG. 1, a reel motor 11, preferably of the permanent magnet type, having an excitation winding 12 is mechanically coupled to tape reel 13. The conventional magnetic tape transport system employs two such reels with reel motors, one being the supply reel with its drive motor and the other being the take-up reel with its drive motor. During the data transfer direction of tape movement, the supply reel is driven in a forward direction at a controlled and regulated speed to insure that the magnetic tape will be drawn over the air gap of a magnetic transducer (not shown) at a desired linear speed. The take-up reel is driven at a controlled speed to insure that the magnetic tape is properly taken up and stored during the usual reading cycle.

During the rewind cycle, the usual supply reel becomes the "take-up" reel while the usual take-up reel "supplies" the tape. In the preferred embodiment of the invention, the reel motor of the usual supply reel of the magnetic tape transport system is employed to provide a source of power or back electromotive force although the motor of the take-up reel could also be employed, if desired. For the purpose of simplification, only one reel motor 11 with reel 13 is illustrated in FIG. 1, and this reel will be referred to hereinafter as the supply reel.

A capstan motor 21, which may be of the permanent magnet type, with excitation winding 22 is employed to rotate a capstan 23 for transporting the magnetic tape over the surface of the magnetic head. To provide for the abrupt starting and stopping of magnetic tape during the normal operation of a tape transport system, a capstan motor is generally selected to be of a typ having a low moment of inertia, such for example, as a permanent magnet field type with a light-weight, printed-circuit rotor. The speed of the capstan motor is carefully controlled during the forward direction of tape movement to achieve the desired, constant linear speed of tape movement over the head. During the rewind cycle of operation, the capstan and the reels are usually driven at angular speeds considerably higher than the speeds of operation in the forward direction of operation.

Power to operate tape transport system may be obtained from conventional power sources, such as a public utility, or any other suitable source, and such a source 31 is indicated in FIG. 1. This source of power is usually supplied through an appropriate reel motor speed control unit 32 to the reel motor and through a capstan motor speed control unit 33 to the capstan motor. The speed control units 32 and 33 control the starting, running, and stopping characteristics of the magnetic tape in the forward and reverse directions in a conventional manner.

The present invention employs a double-pole, double-throw relay switching device 34 having first and second movable contacts 35, 36 each associated, respectively, with fixed relay contacts 37, 38 and 39, 40 for coupling the speed control signal from speed control unti 32 to the winding 12 of the reel motor 11 and the speed control signal from speed control unit 33 to the winding 22 of capstan motor 21. Relay coil 41 is coupled to the source of power 31 to energize relay 34, and the movable contacts 35 and 36 are illustrated in the energized position.

As long as relay 34 remains energized, the supply reel motor 11 and the capstan motor 21 opeate in their conventional manner. In the event relay 34 should become de-energized, the movable contacts 35 and 36 are electrically disconnected from fixed contacts 38, 40 and are coupled, respectivelye, to fixed contacts 37, 39. Relay 34 could become de-energized, for example, by a failure or loss of power from source 31, or by other means such as a failure in the internal wiring or connections in the electrical path between source 31 and the relay winding 41. Upon any such failure, the usual speed control signals from the speed control units 32 and 33 are automatically removed from the windings 12 and 22 of reel motor 11 and capstan motor 21. Under this condition, the winding 12 of reel motor 11 is coupled through first movable contact 35 to fixed contact 37 to a fixed load resistor 42, and, further, through fixed contact 39 and second movable contact 36 to the winding 22 of capstan motor 21.

To achieve efficient braking of a rotating electrical motor, the use of dynamic braking has been employed. This type of braking is characterized by the use of the internally generated electromotive force, generally called "back *emf*," as a source of energy to create a reverse or opposing magnetic field within the motor itself. This opposing magnetic field creates an internal magnetic force resisting the continuing rotation of the electrical motor. The fixed resistor 42 is selected to have a resistance value and power dissipation rating so as to achieve efficient dynamic braking of reel motor 11 without exceeding the peak current limit of the motor. The peak current limit of a typical permanent magnet reel motor which must not be exceeded is that value of current which will begin to demagnetize the motor.

The electromotive force or back *emf* internally generated within the rotating reel motor 11, when the normally applied power is lost or removed, appears across winding 12. The automatic coupling of this electromotive force through movable contact 35 and fixed contact 37 of relay 34 to the fixed resistor 42 achieved dynamic braking. The magnitude of this electromotive force is determined by the design of reel motor 11 and is directly proportional to the angular speed of rotation of reel 13.

The magnitude of the braking force applied to reel motor 11, and thus to reel 13, under dynamic braking is a direct function of the angular velocity of reel 13 and motor 11. Maximum braking force occurs at the highest angular velocity of reel 13. Accordingly, as the reel 13 is slowing down under dynamic braking, the magnitude of the internally generated electromotive force reduces resulting in a decrease of the magnitude of the braking force. As a result, the angular velocity of reel 13 and reel motor 11 does not decrease in a linear manner but in a manner approximating an exponential decay, as represented in FIG. 2.

For a given size and rating for the reel motor 11, its angular velocity of rotation during the normal rewind cycle is a function of the amount of tape on reel 13. A full reel results in the lowest angular velocity of rotation while an empty reel produces the highest angular velocity.

The length of time required to bring a rotating reel and reel motor to a full stop with dynamic braking in a typical tape transport system is illustrated in FIG. 2. For the example of an empty reel turning at its highest angular velocity, the braking characteristic follows the broken line characteristic 51 in FIG. 2. Where the reel is full of tape and the angular velocity is at its lowest value, dynamic braking will stop the reel and reel motor in accordance with the solid line characteristic 52 as illustrated in FIG. 2. If the reel is neither full of tape nor empty, the braking characteristic will fall in between the two curves 51, 52 of FIG. 2.

In a typical example, the angular velocity of a ten-inch diameter reel normally driven by a one and one-half horsepower reel motor can be reduced from a value of 2,500 revolutions per minute to zero in approximately one second. If the angular velocity of the reel were reduced at a linear rate instead of an exponential rate, and the tape speed in rewind averaged 700 inches per second, some 350 inches of tape would be rewound in one second. However, by virtue of the higher rate of reduction of the angular velocity in accordance with the exponential braking characteristic as illustrated in FIG. 2, approximately 200 to to 225 inches of tape would be rewound on the supply reel in one second.

The vacuum column between capstan and supply reel in a typical tape transport system has a maximum storage capacity of only 60 to 70 inches of tape. Upon a power failure in rewind, the conventional capstan and capstan motor with its low inertia can reach a complete stop in a small fraction of one second. The higher inertia supply reel and reel motor will continue to rotate after the capstan has stopped causing all of the reserve of tape in the vacuum column to be drawn out. When the reserve of tape in the vacuum column has been exhausted, the rotating supply reel continues to rewind thereby pulling the tape over the stationary capstan and causing serious damage to the tape.

In accordance with the invention, the above problem is solved by employing the internally generated electromotive force of reel motor 11 as a source of energy to power the capstan motor upon a loss of primary power, thereby maintaining rotation of the capstan 23 until the reel 13 and reel motor 11 is completely stopped by dynamic braking. The internally generated electromotive force or back *emf* from winding 12 is automatically coupled, upon a loss of primary power, through the relay contacts 35, 37 and 39, 36 to the winding 22 of capstan motor 21.

The speed of capstan motor 21 is proportional to the magnitude of the voltage applied to winding 22. Since the electromotive force or back *emf* from reel motor 11 is proportional to the speed of reel 13, the magnitude of this electromotive force tends to follow the reduction in speed of the reel and reel motor in accordance with the graph of FIG. 2. Thus, in the event of a power failure when reel 13 is revolving at its highest speed, a large back *emf* is generated and applied to capstan motor 21. When reel 13 is revolving at its lowest speed, a smaller back *emf* is generated and applied to capstan motor 21. This feature achieves the desired result of controlling the speed of the capstan motor 21 in accordance with the dynamic braking characteristic of reel 13 and reel motor 11. The capstan 23, therefore, revolves at a speed closely following the speed of reel 13 and motor 11, stopping only when the reel 13 and motor 11 is braked to a full stop.

Under this condition, the capstan 23 of capstan motor 21 continues to supply tape into the vacuum column at a desired and controlled rate maintaining sufficient tape within the vacuum column until both reel 13 and capstan 23 are completely stopped. The possibility of any damage to or breakage of magnetic tape is thereby eliminated.

While the present invention will operate to energize the capstan motor 21 in either the forward or the reverse direction of tape travel upon a power failure, its significance is most apparent during the high-speed rewind cycle. Whether the reel speed is high or low, forward or reverse, the invention automatically operates to maintain the speed of capstan motor 21 in close synchronism with the speed of reel motor 11 during dynamic braking.

While preferred, the invention is not limited to the use of the internally generated back *emf* of the reel motor as the source of energy to power the capstan motor in the event of failure of the primary source. It is apparent that a separate voltage generator could be employed coupled to the shaft of the reel motor, if desired. It is also apparent that other means for detecting the loss of power to the capstan motor could be employed to simultaneously initiate dynamic braking while maintaining rotation of the capstan motor without departing from the spirit of the invention.

Since many changes can be made in the above-described apparatus and many different embodiments of this invention could be made without departing from the scope thereof, it is intended that all matter contained in the above description or shown in the accompanying drawings shall be interpreted as illustrative and not in a limiting sense.

What is claimed is:

1. In a magnetic tape transport system, the combination comprising:

a. at least one relatively high inertia reel means adapted for receiving or dispensing a roll of magnetic tape;

b. voltage generating means coupled to said reel means for producing a voltage varying according to the velocity of rotation of said reel means;

c. a relatively low inertia capstan motor for controlling the velocity of the magnetic tape passing over a magnetic head; and d. switching means intercoupled between said voltage generating means and said capstan motor, said switching means being adapted to automatically couple said voltage varying according to the velocity of rotation of said reel means to said capstan motor upon the loss of power being supplied to said capstan motor for causing said capstan motor to continue to rotate in the same direction as prior to the loss of power with a velocity of rotation in accordance with the voltage varying according to the velocity of rotation of said reel means.

2. The magnetic tape transport system as defined by claim 1 wherein said voltage generating means is a reel motor for rotating said reel means, and said voltage varying according to the velocity of rotation of said reel means is the back electromotive force generated by said rotating reel motor when said reel motor is deenergized.

3. The magnetic tape transport system as defined by claim 1 further comprising dissipating means coupled to said switching means, said dissipating means being automatically coupled to said voltage generating means upon the loss of power being supplied to said capstan motor.

4. The magnetic tape transport system as defined by claim 3 wherein said dissipating means is a resistor, and wherein said switching means automatically couples said resistor across said voltage generating means upon the loss of power being supplied to said capstan motor.

5. The magnetic tape transport system as defined by claim 1 wherein said switching means intercoupled between said voltage generating means and said capstan motor is an electromagnetic relay having first and second movable contacts and a relay coil, said relay coil being normally energized by the source of power for supplying said capstan motor and being deenergized upon the loss of power being supplied to said capstan motor, said voltage varying according to the velocity of rotation of said reel means being coupled through the first and second movable contacts of said electromagnetic relay to said capstan motor when said relay coil is de-energized.

6. In a tape transport system, the combination comprising:

a. at least one reel means adapted for receiving or dispensing a roll of magnetic tape;

b. reel motor means mechanically coupled to said reel means for rotating said reel means;

c. a capstan motor for transporting the tape from said reel means at a controlled velocity, said reel means and said reel motor means possessing an appreciably higher moment of inertia than the moment of inertia of said capstan motor; and d. switching means electrically coupled to said reel motor means and said capstan motor means, said switching means being responsive to a source of electrical power for supplying electrical power to said reel motor means and said capstan motor means during normal operation of said tape transport system, said switching means being further responsive to a loss of electrical power from said source for automatically coupling the back electromotive force generated by said rotating reel motor to said capstan motor, said back electromotive force being coupled to said capstan motor so that said capstan motor is caused to continue to rotate in the same direction as prior to the loss of power with a velocity of rotation in accordance with the velocity of rotation of said reel means.

7. The tape transport system as defined by claim 6 further comprising a resistor means coupled to said switching means, said switching means automatically coupling said resistor means to said reel motor means upon a loss of electrical power from said source to provide dynamic braking of said reel motor means.

8. The tape transport system as defined by claim 6 wherein said reel motor means is a permanent-magnet direct current motor and said capstan motor is a low-inertia direct current motor.

9. The tape transport system as defined by claim 8 wherein said reel motor means and said capstan motor each include an electrical winding, and wherein said switching means responsive to a loss of electrical power from said source automatically couples the electrical winding of said reel motor means to the electrical winding of said capstan motor.

10. The tape transport system as defined by claim 6 wherein said tape is magnetic, and wherein said capstan motor operates to transport the magnetic tape from said reel means over the face of a magnetic head at a controlled velocity.

* * * * *